United States Patent [19]
Yamazaki

[11] Patent Number: 5,379,131
[45] Date of Patent: Jan. 3, 1995

[54] METHOD OF PREVENTING FORGERY OF DIFFRACTION GRATING PATTERN AND FORGERY-PROOF DIFFRACTION GRATING PATTERN RECORDING STRUCTURE

[75] Inventor: Satoshi Yamazaki, Tokyo, Japan
[73] Assignee: Dai Nippon Printing Co., Ltd., Tokyo, Japan
[21] Appl. No.: 989,086
[22] Filed: Dec. 10, 1992

[30] Foreign Application Priority Data

Dec. 11, 1991 [JP] Japan .................. 3-327683

[51] Int. Cl.$^5$ .............................. G03H 1/00
[52] U.S. Cl. ........................... 359/2; 356/71; 235/457; 283/86; 380/54
[58] Field of Search ............. 356/71; 359/2; 235/457; 283/86; 380/54

[56] References Cited

U.S. PATENT DOCUMENTS

| | | | |
|---|---|---|---|
| 4,034,211 | 7/1977 | Horst et al. | 235/61.12 N |
| 4,501,439 | 2/1985 | Antes | 283/91 |
| 4,568,141 | 2/1986 | Antes | 350/3.61 |
| 4,761,543 | 8/1988 | Hayden | 235/457 |
| 4,856,857 | 9/1988 | Takeuchi et al. | 350/3.6 |
| 4,913,504 | 4/1990 | Gallagher | 350/3.6 |
| 5,059,776 | 10/1991 | Antes | 235/457 |
| 5,200,794 | 12/1993 | Nishiguma et al. | 356/71 |

FOREIGN PATENT DOCUMENTS 0283384 12/1987 Japan .................. 259/2

*Primary Examiner*—Loha Ben
*Assistant Examiner*—Thomas Robbins
*Attorney, Agent, or Firm*—Dellett and Walters

[57] ABSTRACT

A method of preventing forgery of a diffraction grating pattern containing the record of specific information, and a forgery-proof diffraction grating pattern recording structure. Patterns ($2_1$ to $2_4$), which are to be recorded, are recorded as diffraction gratings or interference fringe patterns, which comprise grating lines or fringes extending in a specific direction at a specific spacing and which are formed in respective pattern regions. Each of the recorded pattern regions is surrounded either entirely or partly with a region including a diffraction grating or an interference fringe pattern, which is different from the diffraction grating or fringe pattern in the recorded pattern region in terms of at least either the direction or spacing of the grating lines or fringes, thereby preventing forgery of the recorded diffraction grating pattern (1).

11 Claims, 4 Drawing Sheets

METHOD OF PREVENTING FORGERY OF DIFFRACTION GRATING PATTERN AND FORGERY-PROOF DIFFRACTION GRATING PATTERN RECORDING STRUCTURE

BACKGROUND OF THE INVENTION

The present invention relates to a method of preventing forgery of the record of patterns, such as characters, designs, etc., formed on the basis of the position, arrangement or configuration of regions in which diffraction gratings or interference fringe patterns are formed. The present invention also relates to a forgery-proof diffraction grating pattern or interference fringe pattern recording structure.

It has heretofore been known through calendars, bar codes, etc. to record and display patterns, such as characters, designs, etc., on the basis of the profiles of regions where diffraction gratings or interference fringe patterns are formed. Hereinafter, such a pattern will be referred to as "diffraction grating pattern".

It is also known that forgery-proof information is formed on cards or the like by using such a diffraction grating pattern.

In general, such a diffraction grating pattern can be readily read by a visual observation, and it is not always difficult to read and forge it.

SUMMARY OF THE INVENTION

In view of these circumstances, it is an object of the present invention to provide a method of preventing forgery of a diffraction grating pattern containing the record of specific information, and a forgery-proof diffraction grating pattern recording structure.

To attain the above-described object, the present invention provides a method of preventing forgery of a diffraction grating pattern, in which a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern formed in a region including at least the region for forming the pattern, which are arranged side by side or superposed one upon another and each of which comprises grating lines or fringes extending in a specific direction at a specific spacing. Then, at least a part of the recorded pattern region is surrounded with a region including a diffraction grating or an interference fringe pattern, which is different from the diffraction grating or fringe pattern in the recorded pattern region in terms of at least either the direction or spacing of the grating lines or fringes, thereby preventing forgery of the recorded diffraction grating pattern.

In addition, the present invention provides a method of recording a diffraction grating pattern, in which a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern formed in a region including at least the region for forming the pattern, which are arranged side by side or superposed one upon another and each of which comprises grating lines or fringes extending in a specific direction at a specific spacing. Then, at least a part of the recorded pattern region is surrounded with a region including a diffraction grating or an interference fringe pattern, which is different from the diffraction grating or fringe pattern in the recorded pattern region in terms of at least either the direction or spacing of the grating lines or fringes, thereby recording a diffraction grating pattern.

In addition, the present invention provides a method of reading a diffraction grating pattern recording structure, in which a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern formed in a region including at least the region for forming the pattern, which are arranged side by side or superposed one upon another and each of which comprises grating lines or fringes extending in a specific direction at a specific spacing. At least a part of the recorded pattern region is surrounded with a region including a diffraction grating or an interference fringe pattern, which is different from the diffraction grating or fringe pattern in the recorded pattern region in terms of at least either the direction or spacing of the grating lines or fringes, thereby forming a diffraction grating pattern recording structure. Then, illuminating light is applied to the diffraction grating pattern recording structure from a predetermined direction, and light diffracted in a specific direction from the illuminated position is read, thereby reading the diffraction grating pattern recording structure.

In addition, the present invention provides a method of judging whether a diffraction grating pattern recording structure is genuine or a forgery, in which a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern formed in a region including at least the region for forming the pattern, which are arranged side by side or superposed one upon another and each of which comprises grating lines or fringes extending in a specific direction at a specific spacing. At least a part of the recorded pattern region is surrounded with a region including a diffraction grating or an interference fringe pattern, which is different from the diffraction grating or fringe pattern in the recorded pattern region in terms of at least either the direction or spacing of the grating lines or fringes, thereby forming a diffraction grating pattern recording structure. Then, illuminating light is applied to the diffraction grating pattern recording structure from a predetermined direction, and light diffracted in a specific direction from the illuminated position is detected, thereby judging whether the diffraction grating pattern recording structure is genuine or a forgery.

In addition, the present invention provides a forgery-proof diffraction grating pattern recording structure including a pattern to be recorded, which is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern formed in a region including at least the region for forming the pattern, which are arranged side by side or superposed one upon another and each of which comprises grating lines or fringes extending in a specific direction at a specific spacing. The forgery-proof diffraction grating pattern recording structure further includes a region including a diffraction grating or an interference fringe pattern, which surrounds at least a part of the recorded pattern region and which is different from the diffraction grating or fringe pattern in the recorded pattern region in terms of at least either the direction or spacing of the grating lines or fringes.

The recorded pattern region may be formed as a bar code-shaped pattern. The forgery-proof diffraction grating pattern recording structure may be formed on a part or the whole surface of a card. In addition, the forgery-proof diffraction grating pattern recording structure may be formed in a portion of a card where a hole is to be punched.

It should be noted that the forgery-proof diffraction grating pattern recording structure may be formed as a transfer foil.

According to the present invention, a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern, which are arranged side by side or superposed one upon another and each of which comprises grating lines or fringes extending in a specific direction at a specific spacing. Then, at least a part of the recorded pattern region is surrounded with a region of a diffraction grating or an interference fringe pattern, which is different from the diffraction grating or fringe pattern in the recorded pattern region in terms of at least either the direction or spacing of the grating lines or fringes, thereby forming a diffraction grating pattern recording structure. Thus, the recorded pattern is camouflaged so that it cannot be identified at a glance. Even when the recorded pattern is to be read mechanically on the basis of diffracted light from the diffraction grating or interference fringe pattern in the recorded pattern region, it is impossible to recognize diffracted light from the recorded pattern unless the position of the recorded pattern region and the direction as well as spacing of the grating lines or fringes are known in advance. Accordingly, a diffraction grating pattern recording structure which is difficult to forge can be obtained.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the diffraction grating pattern forgery preventing method and forgery-proof diffraction grating pattern recording structure according to the present invention will be described below with reference to the accompanying drawings. Although the present invention will be explained below by way of one example in which information is recorded by using diffraction gratings, it should be noted that the diffraction gratings may be replaced with a hologram comprising substantially parallel interference fringes.

Figure 1:
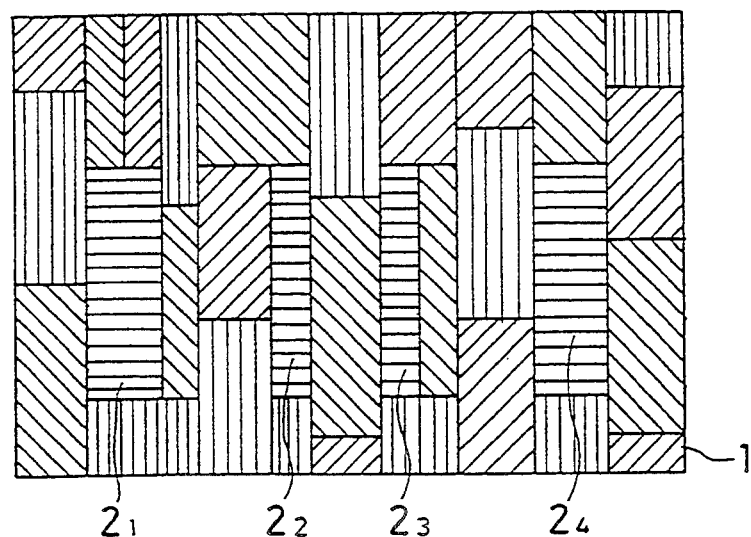
FIG. 1 is a plan view of one embodiment of the diffraction grating pattern recording structure according to the present invent ion.

FIG. 1 is a plan view of one embodiment of the present invention, showing a diffraction grating pattern recording structure 1 in which a bar code is recorded on the basis of the profile of each region where a diffraction grating is formed. In the figure, four diffraction grating regions $2_1$ to $2_4$, in which grating lines extend horizontally, represent a bar code. These regions are patterns which are originally provided for recording information. Each of the recorded pattern regions $2_1$ to $2_4$ is surrounded with a multiplicity of diffraction grating regions (dummy diffraction gratings) which are different from the regions $2_1$ to $2_4$ in terms of at least either the direction or spacing of the grating lines. Thus, the recorded pattern regions $2_1$ to $2_4$ are camouflaged so that no recorded information region can be identified at a glance, as will be clear from the figure. Even when the recorded information is to be read mechanically on the basis of diffracted light from these diffraction gratings, it is impossible to recognize diffracted light from the recorded information region unless the direction and spacing of the diffraction grating lines of the recorded pattern regions $2_1$ to $2_4$ are known in advance. Accordingly, a bar code which is difficult to forge can be formed.

Figure 2:
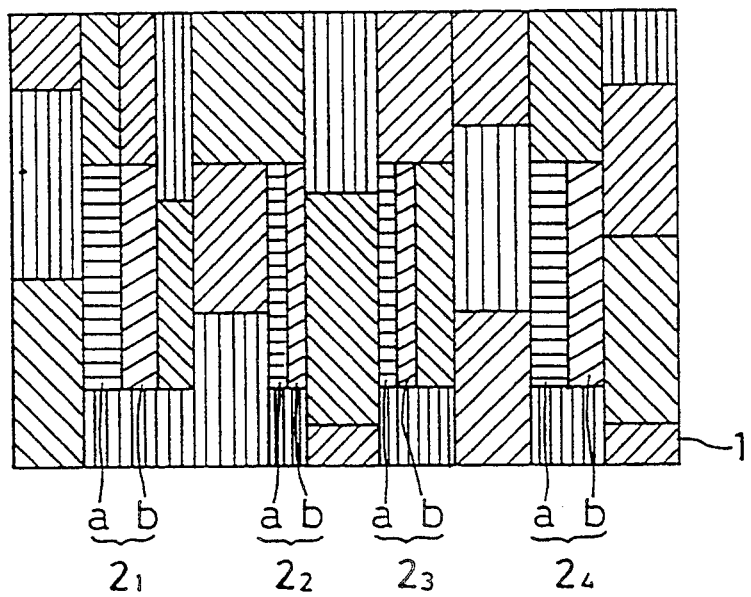
FIG. 2 is a plan view of another embodiment of the diffraction grating pattern recording structure according to the present invention.

Although in the example shown in FIG. 1 the recorded pattern regions $2_1$ to $2_4$ are recorded by using one kind of diffraction grating, it is also possible to record as shown in FIG. 2 grating patterns $2_1$ to $2_4$ by using a combination of a grating a comprising horizontal lines, and a relatively coarse grating b comprising lines which slant to the left. In addition, such two different gratings may be replaced with patterns which are formed by multiple recording, or three or more different gratings may be disposed in each recorded pattern region by subdividing it into minute regions (for example, see Japanese Patent Application Laid-Open (KOKAI) No. 3-211096 (1991), and Japanese Patent Application Nos. 3-303413 (1991) and 3-303414 (1991)). Further, the grating a, which comprises horizontal lines, and the relatively coarse grating b, which comprises lines slanting to the left, may be provided independently of each other to form the recorded grating patterns $2_1$ to $2_4$, which are patterns to be recorded. In these alternative arrangements also, each recorded pattern region is surrounded with dummy diffraction gratings to make it difficult to forge the diffraction grating pattern, as a matter of course.

Figure 3:
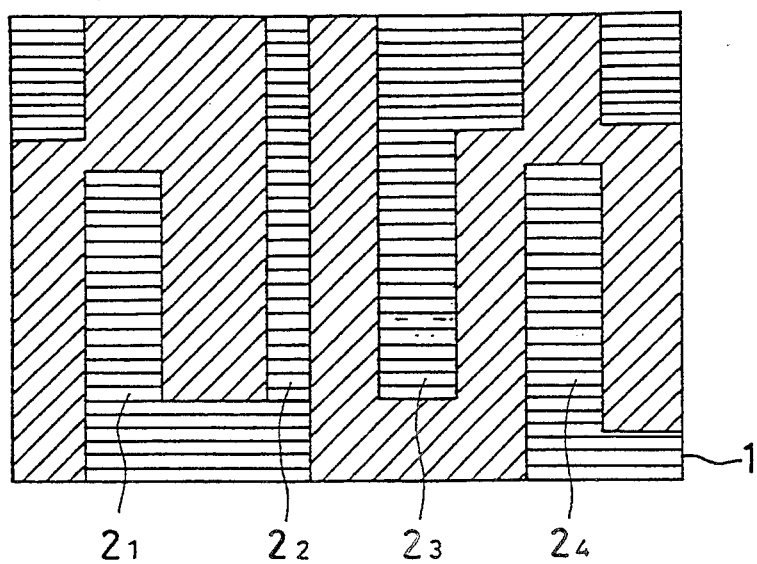
FIG. 3 is a plan view of still another embodiment of the diffraction grating pattern recording structure according to the present invention.

In the arrangement shown in FIG. 3, diffraction grating regions, each comprising horizontal lines, are formed in regions respectively including patterns $2_1$ to $2_4$ which are to be recorded. A relatively coarse diffraction grating (dummy diffraction grating), which comprises lines slanting to the left, is formed so as to surround partly each of the patterns $2_1$ to $2_4$. By forming a diffraction grating in a region including a pattern to be recorded, as described above, the presence of the pattern itself becomes obscured, and the diffraction grating patterns can be made adequately difficult to forge even by providing only one kind of dummy diffraction grating. The diffraction grating pattern recording structure 1 can be produced simply by carrying out exposure twice using mask patterns.

Figure 4:
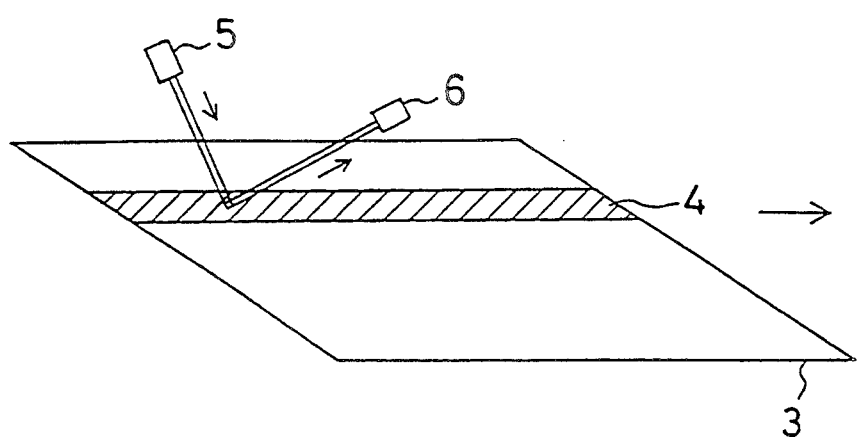
FIG. 4 shows schematically one arrangement for reading a bar code recording structure according to the present invention.
Figure 5:
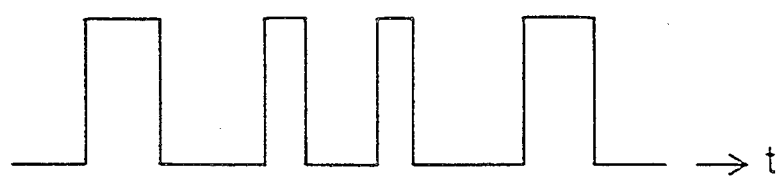
FIG. 5 shows a waveform of a signal obtained with the arrangement shown in FIG. 4.

Incidentally, there are some methods usable for reading the diffraction grating patterns, which are surrounded either entirely or partly with the dummy diffraction gratings so as to make them difficult to forge. According to a first reading method, the diffraction grating pattern recording structure 1 is moved while being illuminated with a beam of monochromatic light from a predetermined direction so that the illuminating region scans across the recording structure 1. In addition, a light-receiving element is disposed in a specific direction for receiving diffracted light from the grating patterns $2_1$ to $2_4$, thereby reading the recorded patterns as a temporal signal. FIG. 4 shows schematically an arrangement for reading a card 3 having the recording structure 1, which contains the record of a bar code as shown in FIG. 1, attached to a stripe region 4 thereof. If the card 3 is moved in the direction of the arrow while the stripe region 4 is being illuminated with a beam of light from a monochromatic light source 5, for example, a semiconductor laser, the illuminating light is diffracted from the regions $2_1$ to $2_4$ in a specific direction and enters the light-receiving element 6, which is disposed at the position for receiving the diffracted light. The illuminating light is also diffracted by the surrounding dummy diffraction gratings, as a matter of course. However, since the dummy diffraction gratings are different from the regions $2_1$ to $2_4$ in the direction and spacing of the grating lines, no light is incident on the light-receiving element 6 at a position where the light illuminates a dummy diffraction grating. Accordingly, as the card 3 is moved, a signal having a waveform such as that shown exemplarily in FIG. 5 is obtained from the light-receiving element 6, so that it is possible to read the recorded bar code from the signal and it is also possible to judge whether the recording structure concerned is genuine or a forgery. According to another reading method, light having an illuminating region that covers the whole recording structure 1 is applied to the recording structure 1 from a predetermined direction, Consequently, only the recorded pattern regions diffract the illuminating light in a specific direction. Accordingly, if a CCD camera or the like is installed in the specific direction, diffracted light can be recognized with ease. It is, needless to say, possible to judge whether the recording structure 1 is genuine or a forgery by a visual observation instead of using a CCD camera or the like. To read diffraction grating patterns, each formed by using a plurality of diffraction gratings, for example, by arranging a plurality of diffraction gratings side by side, as shown in FIG. 2, a plurality of light-receiving elements are disposed to correspond to respective positions for receiving diffracted light from the associated diffraction gratings, and signals that are obtained from these light-receiving elements are added together (in the case of the diffraction gratings arranged side by side) or multiplied together (in the case of the diffraction gratings superposed one upon another), thereby reading the bar code and judging whether the recording structure is genuine or a forgery. In a case where diffraction grating patterns are recorded as two-dimensional patterns, the system may be arranged such that the illuminating region scans the recording structure two-dimensionally to thereby read the patterns.

Figure 6:
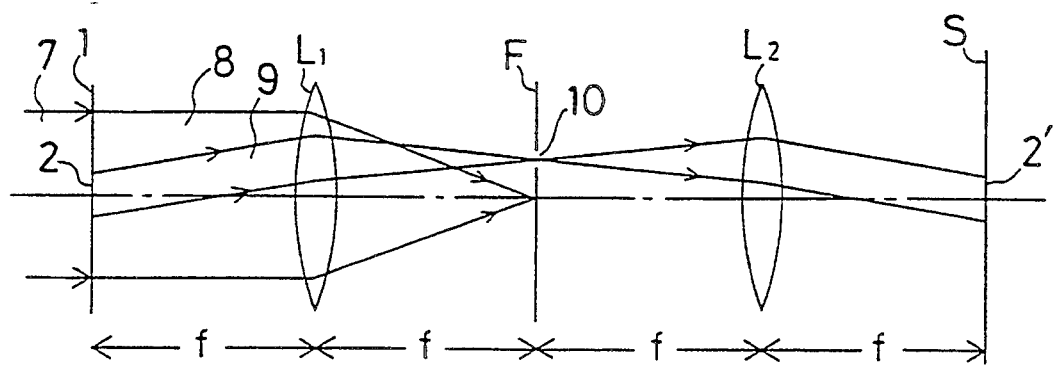
FIG. 6 is an optical path diagram showing another arrangement for reading.

The diffraction grating patterns, which are surrounded either entirely or partly with the dummy diffraction gratings so as to make them difficult to forge, as shown in FIGS. 1 or 2, can also be read by a method that utilizes spatial filtering. FIG. 6 is an optical path diagram showing one example of this reading method. The recording structure 1 is disposed at the front focal point of a lens L1, and a spatial filter F is disposed on the back focal plane of the lens L1. In addition, a lens L2 is coaxially disposed so that the front focal plane thereof is coincident with the spatial filter F, and a screen or a two-dimensional light-receiving element S is disposed on the back focal plane of the lens L2. With this arrangement, when the recording structure 1 is illuminated with coherent monochromatic light 7 along the optical axis, the zero-order beams 8 are focused on the center of the spatial filter F by the lens L1. On the other hand, diffracted light from a pattern region 2 of the recording structure 1, which contains information, is concentrated by the lens L1 so as to focus at a position on the spatial filter F, which corresponds to the spatial frequency of the diffraction grating concerned. If an aperture 10 is provided at the above-described position on the spatial filter F, only diffracted light 9 from the pattern region 2 passes through the spatial filter F, and a pattern 2' which is similar to the pattern region 2 is formed on the screen or two-dimensional light-receiving element S by the lens L2. Thus, the pattern region 2 of the recording structure 1 can be read. It should be noted that diffracted light from the dummy diffraction gratings are focused at positions different from the aperture 10 of the spatial filter F and hence blocked by the filter F. Therefore, only the diffraction grating patterns 2, which contain information, are obtained on the screen or two-dimensional light-receiving element S.

Figure 7:
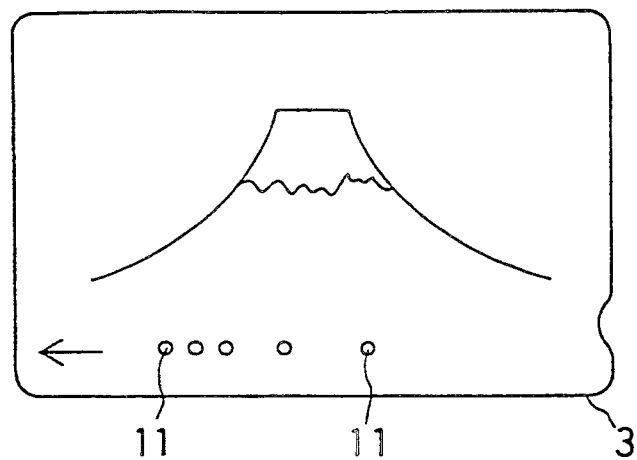
FIG. 7 is a plan view of an embodiment in which the recording structure according to the present invention is formed in a portion of a card where holes are to be punched.

The above-described recording structure can be applied to forgery-proof record portions of cards, for example, prepaid cards, cash dispenser cards, etc. In such a case, the recording structure of the present invention is provided in the stripe region 4 or other specific portion of the card 3 to record necessary information, which is difficult to recognize and forge, as shown in FIG. 4. In particular, when the present invention is applied to cards which are punched to record and display a number of times of use or other information as in the case of prepaid cards, diffraction grating patterns of the present invention are provided in a portion 11 of a card 3 where holes are to be punched, as shown by a plan view in FIG. 7, thereby making it possible to read necessary information before the card 3 is used, and to prevent the card 3 from being falsified so as to be usable again after it has been used once.

Figure 8:
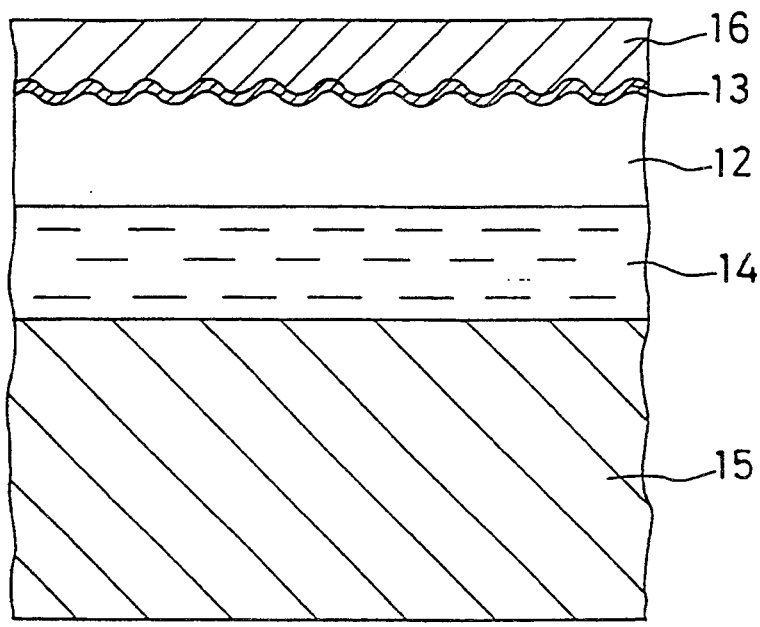
FIG. 8 is a sectional view showing the recording structure of the present invention which is formed as a transfer foil.
Figure 9:
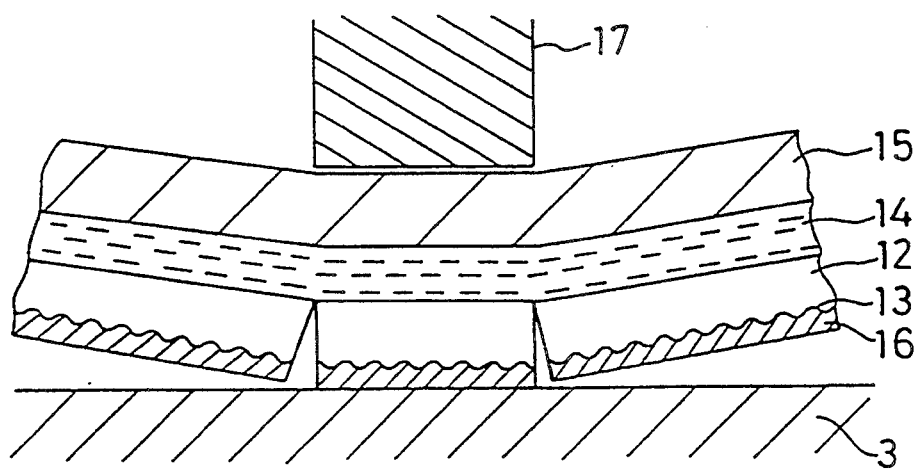
FIG. 9 illustrates a method of transferring the transfer foil, shown in FIG. 8, to a card.

Incidentally, the above-described diffraction grating pattern recording structure may be recorded directly on a card or other object on which necessary information is to be recorded. However, it is more practical to arrange such a recording structure in the form of a diffraction grating pattern transfer foil and transfer it to an object on which necessary information is to be recorded. FIG. 8 is a sectional view showing an embodiment in which such a diffraction grating pattern is formed as a reflection relief diffraction grating pattern and produced in the form of a transfer foil. The reflection relief diffraction grating pattern comprises a diffraction grating layer 12, and a reflecting layer 13 formed on a dimple grating or interference fringe surface (i.e., relief surface) defined by the surface of the diffraction grating layer 12. The reflecting layer 13 comprises either a deposited metal film, e.g., aluminum or tin, or a high refractive index transparent film, e.g., zinc sulfide. With a deposited metal film, a reflection relief diffraction grating pattern that reflects the incident light substantially completely by the metal is formed. With a high refractive index transparent film, the resulting reflection relief diffraction grating pattern is of the type which reflects part of the incident light because of Fresnel reflection based on the refractive index difference between the diffraction grating layer 12 and the reflecting layer 13. Such a reflection relief diffraction grating pattern may be produced by either of the following two methods: one in which a diffraction grating pattern is recorded in the form of a dimple pattern on a photoresist, for example, and the dimple pattern is transferred by plating, for example, to form a stamper, which is then stamped on a transparent resin material that constitutes the diffraction grating layer 12 to duplicate the dimple pattern, and the reflecting layer 13 is formed on the duplicated dimple pattern by deposition or the like; and the other in which the reflecting layer 13 is previously formed on a transparent resin layer that forms the diffraction grating layer 12, and a stamper formed with the above-described dimple pattern is hot-stamped on the reflecting layer 13 to duplicate the dimple pattern (for example, see Japanese Patent Application Laid-Open (KOKAI) No. 58-65466 (1983)). In order to enable the reflection relief diffraction grating pattern to be transferable, a transparent resin layer which forms the diffraction grating layer 12 is provided on a base film 15 of PET (polyethylene terephthalate) or the like through a release layer 14, and after a dimple pattern has been stamped on the transparent resin layer, the reflecting layer 13 is formed thereon. Alternatively, after the reflecting layer 13 has been formed, a dimple pattern is stamped thereon. Further, a heat-sensitive adhesive layer 16 of a low-melting resin material or the like is provided on the reflecting layer 13. The diffraction grating layer 12 and the reflecting layer 13 in a desired profile region of the transfer foil having the above-described arrangement may be transferred to a card substrate of vinyl chloride, for example, by using, for example, a hot stamper, as shown in FIG. 9. That is, the transfer foil is set in between a card substrate 3 to which the diffraction grating pattern is to be transferred and a hot stamper 17 such that the heat-sensitive adhesive layer 16 faces the substrate 3, while the base film 15 faces the hot stamper 17, and in this state the hot stamper 17 is driven. A thermal recording head may be employed in place of the hot stamper.

Although the forgery preventing method and recording structure according to the present invention have been described above by way of some embodiments, it should be noted that the present invention is not necessarily limited to these embodiments and that various changes and modifications may be imparted thereto.

Thus, according to the diffraction grating pattern forgery preventing method and forgery-proof diffraction grating pattern recording structure of the present invention, a pattern, which is to be recorded, is recorded either in the form of at least one kind of diffraction grating or interference fringe pattern, which is formed in a region including at least a region for forming the pattern and which comprises grating lines or fringes extending in a specific direction at a specific spacing, or in the form of a plurality of different kinds of diffraction grating or interference fringe pattern, which are arranged side by side or superposed one upon another and each of which comprises grating lines or fringes extending in a specific direction at a specific spacing. Then, at least a part of the recorded pattern region is surrounded with a region including a diffraction grating or an interference fringe pattern, which is different from the diffraction grating or fringe pattern in the recorded pattern region in terms of at least either the direction or spacing of the grating lines or fringes, thereby forming a diffraction grating pattern recording structure. Thus, the recorded pattern is camouflaged so that it cannot be identified at a glance. Even when the recorded pattern is to be read mechanically on the basis of diffracted light from the diffraction grating or interference fringe pattern in the recorded pattern region, it is impossible to recognize diffracted light from the recorded pattern unless the position of the recorded pattern region and the direction as well as spacing of the grating lines or fringes are known in advance. Accordingly, a diffraction grating pattern recording structure which is difficult to forge can be obtained.

What is claimed is:

1. A method of encoding a diffraction grating pattern for preventing forgery thereof, said method comprising:
   providing a bar code shaped pattern comprising a plurality of parallel bar shapes of various widths and spacings and each in the form of a primary diffraction grating or fringe pattern which comprises grating lines or fringes extending in a specific direction at a specific spacing; and
   contiguously disposing said bar code shaped pattern within a pattern which surrounds said bar code shaped pattern and which comprises a camouflage pattern of a plurality of contiguously arranged diffraction gratings or fringe patterns, each diffraction grating or fringe pattern of said camouflage pattern having a grating/fringe direction or grating/fringe spacing other than said primary diffraction grating or fringe pattern.

2. A method according to claim 1, wherein said primary diffraction grating or fringe pattern comprises at least a first and a second diffraction grating or fringe pattern as a pair arranged side by side or superposed one upon the other.

3. A method according to claim 2, wherein said first and second diffraction gratings or fringe patterns are disposed adjacent one another.

4. A method according to claim 1, wherein said camouflage pattern comprises a dummy arrangement of said plurality of contiguously arranged diffraction gratings or fringe patterns for camouflaging said bar code shape pattern within.

5. A method of determining authenticity of a diffraction grating pattern, said method comprising:
   providing a two-dimensional pattern of a primary diffraction grating or fringe pattern;
   contiguously disposing said two-dimensional pattern within an area of a second pattern of a secondary diffraction grating or fringe pattern having a grating/fringe direction or grating/fringe spacing different from that of said primary pattern;
   illuminating said contiguously disposed two-dimensional and second patterns with coherent light; and
   spatially filtering light diffracted from said contiguously disposed patterns in accordance with said two-dimensional pattern.

6. A recording structure encoded with a diffraction grating pattern for preventing forgery thereof, comprising:
   a bar code shaped pattern comprising a plurality of parallel bar shapes of various widths and spacings and of a primary diffraction grating or fringe pattern which comprises grating lines or fringes extending in a specific direction at a specific spacing; and
   a camouflage pattern of a plurality of contiguously arranged diffraction gratings or fringe patterns, each diffraction grating or fringe pattern thereof having a grating/fringe direction or grating/fringe spacing other than that of said primary diffraction grating or fringe pattern;
   said bar code shaped pattern being disposed in a contiguous relationship within said camouflage pattern such that the bar code shaped pattern is surrounded thereby, said camouflage pattern of said plurality of contiguously arranged diffraction gratings or fringe patterns providing a dummy bogus arrangement thereof for camouflaging said bar code shaped pattern within.

7. A recording structure according to claim 6, wherein said primary diffraction grating or fringe pattern comprises at least a first and a second diffraction grating or fringe pattern as a pair arranged side-by-side or superposed one upon the other.

8. A recording structure according to claim 7, wherein said at least first and second diffraction gratings or fringe patterns are disposed adjacent one another.

9. A recording structure according to any one of claims 6, 7 and 8, which is formed on a part or the whole surface of a card.

10. A recording structure according to claim 9, wherein said recording structure is formed in a portion of said card where a hole is to be punched.

11. A recording structure according to any one of claims 6, 7 and 8, which is formed as a transfer foil.

* * * * *